United States Patent [19]
Lemon

[11] 3,951,011
[45] Apr. 20, 1976

[54] HYDRAULIC CONTROL MECHANISM FOR PLANETARY TRANSMISSION

[75] Inventor: Robert W. Lemon, Farmington, Mich.

[73] Assignee: Borg-Warner Corporation, Chicago, Ill.

[22] Filed: Aug. 30, 1974

[21] Appl. No.: 501,926

[52] U.S. Cl. .............................. 74/869; 74/752 C; 74/867; 74/868
[51] Int. Cl.² ..................... B60K 21/00; F16H 3/74
[58] Field of Search ............. 74/864, 867, 868, 869, 74/752 C

[56] References Cited
UNITED STATES PATENTS

| | | | |
|---|---|---|---|
| 3,248,964 | 5/1966 | Ivey ..................................... | 74/869 |
| 3,310,991 | 3/1967 | Leonard............................. | 74/869 X |
| 3,688,608 | 9/1972 | Leach ................................. | 74/869 |
| 3,714,836 | 2/1973 | Pierce, Jr. et al................. | 74/869 X |

*Primary Examiner*—Samuel Scott
*Assistant Examiner*—Parshofam S. Lall
*Attorney, Agent, or Firm*—Robert L. Zieg

[57] ABSTRACT

An hydraulic control system for an automatic transmission having a plurality of friction engageable devices to produce a plurality of drive ratios by selective engagement thereof, two of the engageable devices comprising friction brakes engageable to establish a second speed drive ratio through the transmission, and conduit means connecting a source of pressure to each of the brake devices and to an hydraulic accumulator. The conduit means has a first branch connected to one of the brake devices, a second branch connected to a second of the brake devices, and a logic valve is provided in the conduit means between the branches adapted to interconnect the branches and the respective servomotors for engaging the brake devices, providing equalization of the pressures at the brake devices whereby they are engaged with identical engaging force. The control circuit includes a restriction control valve, in the conduit means for the direct drive or second clutch of the transmission which is connected between the conduit means and an accumulator for the second clutch, providing an unrestricted flow of pressure to the accumulator when the clutch is being engaged and a restricted flow of pressure from the accumulator to the conduit means when the clutch is disengaged whereby disengagement of the clutch may be controlled without waiting for the stored hydraulic energy in the accumulator to be dissipated.

9 Claims, 4 Drawing Figures

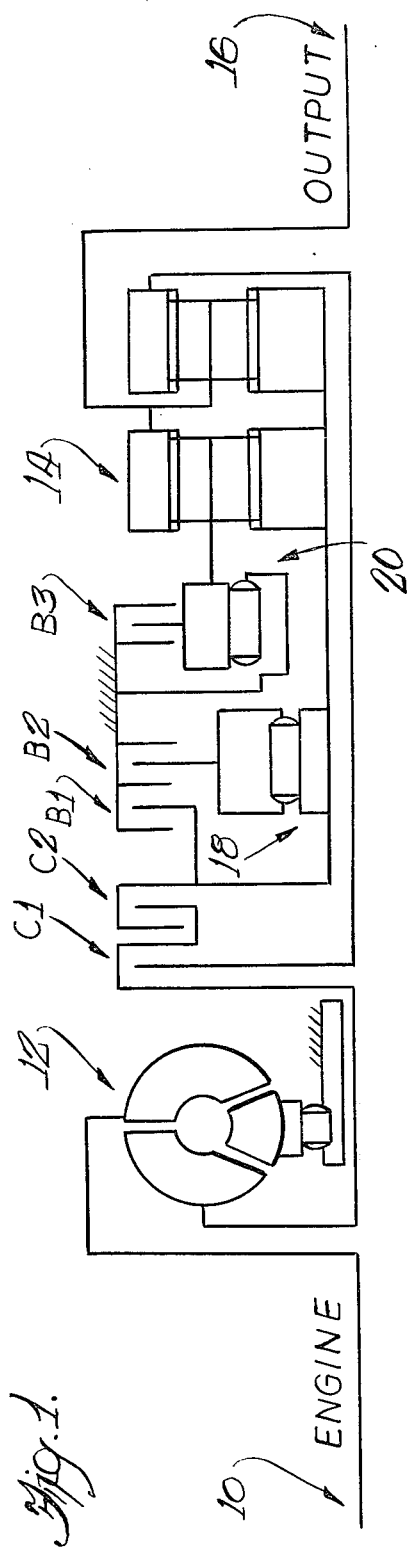

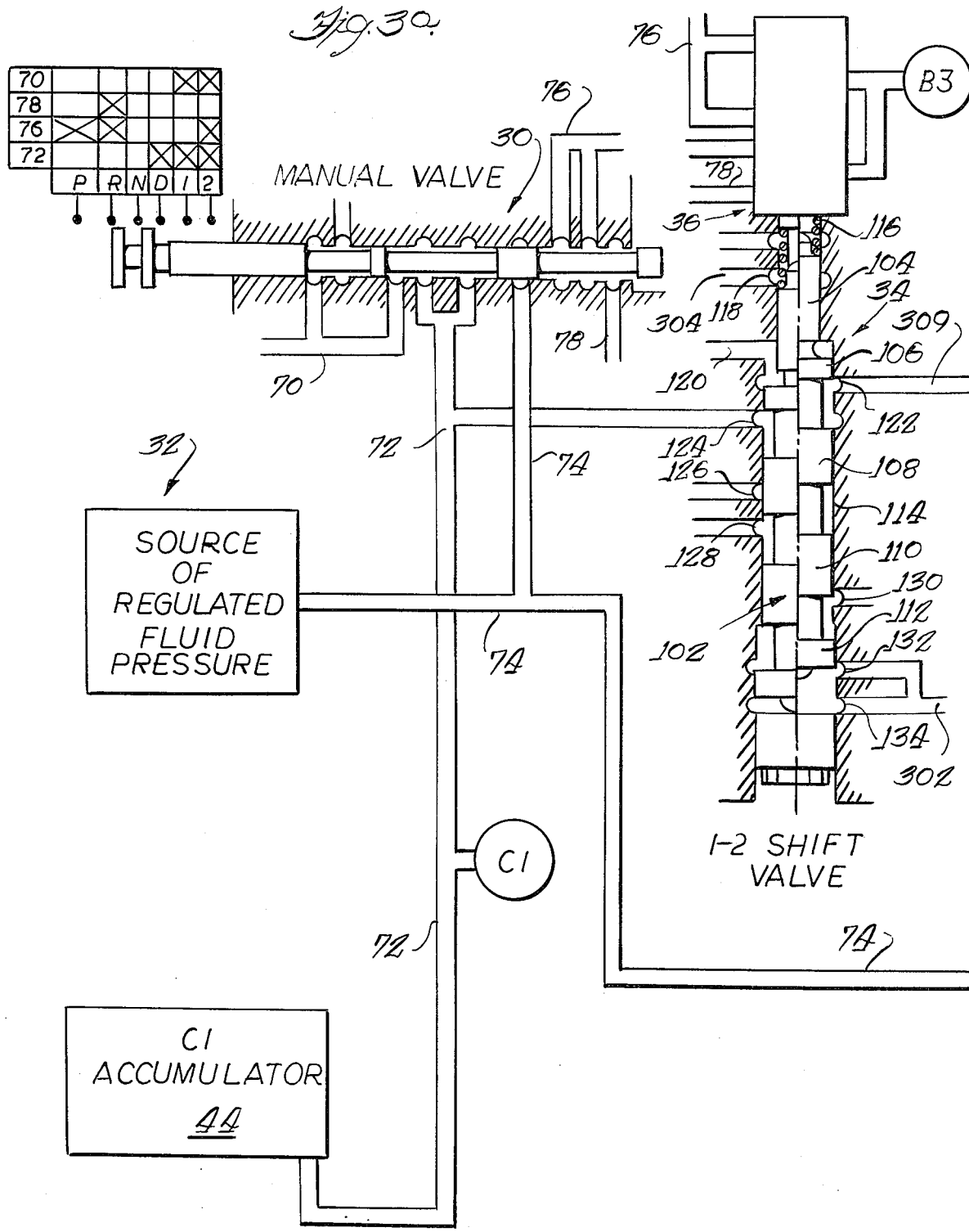

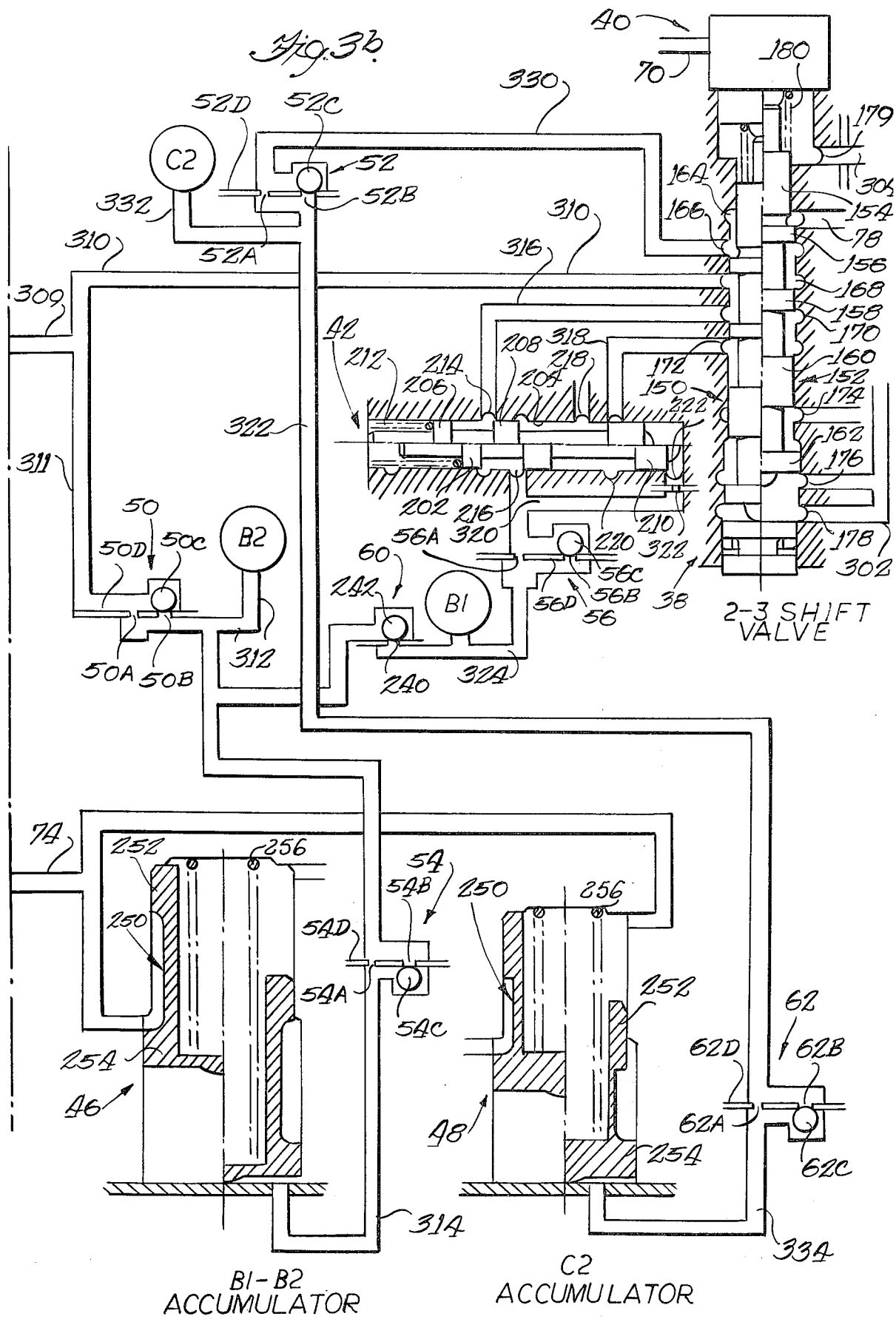

HYDRAULIC CONTROL MECHANISM FOR PLANETARY TRANSMISSION

SUMMARY OF THE INVENTION

In hydraulic control systems of the type used to control automatic transmissions, it has been known particularly in transmissions where a one-way brake is used in second speed ratio requiring a friction brake for the one-way brake and a second friction brake to act as a two-way brake when necessary, to engage both brakes simultaneously at the proper moment in the second speed drive ratio so that the friction brakes for second speed will share the torque load through the transmission, thereby enabling reduced torque capacity requirements for each of the friction brake mechanisms while at the same time increasing the thermal capacity of the second speed friction brake combination. In apparatus of this type a problem is encountered in that unequal fluid pressures applying the two friction brake mechanisms at times will provide a shift which is of poor quality and unacceptable.

The present invention herein described uniquely solves this problem by providing a logic valve means which will interconnect the pressure conduits for the two brake mechanisms and connect same to a common hydraulic accumulator whereby the pressure buildups in the brake mechanisms will be equalized. To provide a smooth ratio change during certain shifts, as for example, when shifting from direct or third speed ratio to second with the manual valve being moved to the 2 position, a pressure reducing valve is provided in a branch conduit to the two-way brake mechanism so that the pressure in the conduit to the two-way brake mechanism is reduced. The logic valve allows disengagement of the two-way brake mechanism while at the same time permitting the brake mechanism for the one-way device to remain engaged by interrupting the connection between the pressure conduits.

In addition, the unique circuit herein described includes a restriction control valve connected with the supply conduit to the direct drive or second clutch mechanism. The restriction control valve solves the heretofore known problem that when hydraulic accumulators are used to control engagement of a friction mechanism a difficult control problem is presented when disengaging the friction mechanism since the energy stored in the hydraulic accumulator must be dissipated while at the same time the control of the disengagement of the clutch is to be timed to provide a smooth transition to the next drive ratio. The present invention solves this difficulty by utilization of the unique restriction control valve which provides an unrestricted flow of fluid from the supply conduit to the second clutch into the accumulator when the clutch is to be engaged and provides a restricted flow of fluid from the accumulator device back to the supply conduit when the clutch is to be disengaged whereby the controlled release of fluid pressure from the second clutch may be accomplished without the necessity of waiting for the stored hydraulic energy in the accumulator to be dissipated prior thereto.

DESCRIPTION OF THE DRAWINGS

FIG. 1 is a longitudinal schematic view of a transmission mechanism with which the improved controls of the present invention are intended to be used;

FIG. 2 is a table showing the various friction elements engaged when the transmission is in its various ranges of operation; and FIGS. 3a and 3b when combined comprise a schematic diagram of the hydraulic controls embodying the principles of the present invention.

DESCRIPTION OF PREFERRED EMBODIMENT

Referring to FIG. 1, a transmission mechanism is schematically disclosed which is of the planetary type providing three speeds, forward and reverse. The transmission structure is specifically described in U.S. Pat. No. 3,744,348 of common assignee. The transmission generally includes an input shaft 10 connected to drive an hydraulic torque converter 12, which in turn drives through a planetary gear set 14 to an output shaft 16. A pair of one-way clutches 18 and 20 are provided which act as reaction elements for distinct elements of the planetary gear set to provide a particular drive ratios. The transmission, has provided therein, a plurality of friction engaging devices to establish the various ratios through the transmission. The friction devices are a first or front clutch C1, a second or rear clutch C2, a first brake B1, a second brake B2, and a third brake B3.

Referring to the table set out in FIG. 2, therein is given an indication of which friction elements are engaged to establish the various ratios through the transmission. In accordance with the table in FIG. 2, it will be seen that clutch C1 and one-way brake 20 provides the first drive ratio through the transmission. This first ratio can also be established by means of engagement of brake B3 as shown in the 1 range to provide a two-way first speed drive ratio. One-way brake 18 is utilized under automatic shifting to establish second ratio through the transmission. One-way brake 18 is made effective by engagement of brake B2. A major distinction between the transmission herein described and that described in U.S. Pat. No. 3,744,348, earlier referred to, is that the B1 brake which provides a two-way drive second speed ratio is also engaged in the second speed automatic position. It has been found that in this manner the torque is more easily held in second speed ratio since the B1 and B2 brakes share the torque load for second speed ratio. Of course, in the 2 position of the drive selector or manual valve B1 and B2 are both applied as described in the above mentioned patent. Third speed drive ratio is established by engagement of clutches C1 and C2 at the same time to lock up the planetary gear set and provide a one to one drive ratio therethrough.

Referring to FIGS. 3a and 3b a schematic control mechanism is illustrated for controlling the transmission of FIG. 1. The schematic disclosed particularly describes the inventive subject set out, namely the unique system for interconnecting engaging pressures for the B1 and B2 brakes so that the same hydraulic accumulator may be utilized for both to equalize pressure buildup and provision for a valve mechanism to eliminate the effect of the C2 accumulator on a 3-2 downshift. The schematic of FIG. 3 does not describe all of the aspects of the hydraulic control system, but the disclosure of U.S. Pat. No. 3,744,348, which is incorporated herein by reference, has a description of a complete control system of the type disclosed herein. This particular description focuses on the distinctions of this control set with respect to that disclosed in U.S. Pat. No. 3,744,348 and is adapted to be used with that system. Of course, the present description will provide those of ordinary skill in the art, sufficient knowledge to make and use the aspects hereof with most automatic transmissions having hydraulic control systems as well as with the transmission structure of U.S. Pat. No. 3,744,348.

The control system as disclosed incorporates a manual valve 30, a source of regulated pressure 32, a 1–2 shift valve 34, a low-coast shift valve 36, a 2–3 shift valve 38, intermediate-coast shift valve 40, intermediate-coast modulator valve 42, C1 accumulator 44, B1–B2 accumulator 46, C2 accumulator 48, a restriction control valve 50, a restriction control valve 52, a restriction control valve 54, and a restriction control valve 56. The control system also incorporates a unique B1–B2 logic valve mechanism 60 and a restriction control valve 62 for accumulator 48.

The various friction elements to be engaged and the servomotors therefore are schematically represented as circles in the schematic drawing of FIGS. 3a and 3b and are labeled C1, C2, B1, B2, and B3 respectively.

Manual valve 30 has conduits 70, 72, 74, 76, 78 connected thereto. Conduit 74 is the main pressure conduit which is supplied with fluid pressure from the source of regulated fluid pressure 32. By reference to U.S. Pat. No. 3,744,348 a more complete description of this source of regulated pressure 32 is provided, however, any known type of regulating system could be used to supply pressure to conduit 74. However, as described in the aforementioned patent, the pressure in main pressure conduit 74 is regulated and correlated with the vehicle speed and engine load to provide a main pressure which responds to conditions of the transmission in accordance with known practices. Main pressure conduit 74 is also connected to accumulators 46 and 48 such that these accumulators have a response correlated with engine torque and vehicle speed to provide varying accumulator response as is more particularly described in U.S. Pat. No. 3,744,348.

Conduit 72 connected to manual valve 30 is the main supply conduit for the friction elements of the transmission. Conduit 72 is connected to the 1–2 shift valve and clutch C1 such that when the manual valve is either of its D, 2, or 1 positions as illustrated in FIG. 2, supply conduit 74 will be connected through the manual valve to conduit 72 to engage clutch C1 and to provide a pressure source to the 1–2 shift valve to be used to engage the friction elements to provide second and third speed ratios. When fluid is supplied to conduit 72, accumulator 44 is effective to control the engagement of clutch C1, as more particularly described in co-pending application Ser. No. 501,925.

The 1–2 shift valve 34 includes a valve stem 102 having lands 104, 106, 108, 110 and 112 thereon. The valve stem 102 is movable within a bore 114. A spring 116 engages land 104 and also engages the low-coast shift valve 36. Also provided within the bore 114 are ports 118, 120, 122, 124, 126, 128, 130, 132 and 134.

The 2–3 shift valve 38 includes a valve stem 150 slidable in a bore 152. The valve stem 150 has lands 154, 156, 158, 160 and 162 thereon. Also provided in the bore 152 are ports 164, 166, 168, 170, 172, 174, 176 and 178. A spring 180 engages land 154 and also engages intermediate-coast shift valve 140.

It should be noted that low-coast shift valve 36 operating in conjunction with 1–2 shift valve 34 and intermediate-coast shift valve 40 operating in conjunction with 2–3 shift valve 38, are not shown or described in detail since U.S. Pat. No. 3,744,348 gives a complete description of these valves.

Intermediate-coast modulator valve 42 includes a valve stem 202 slidable in a bore 204. Valve stem 202 has lands 206, 208 and 210 thereon. A spring 212 engages land 206 urging stem 202 to the right, as viewed in the drawing. The valve 42 includes ports 214, 216, 218, 220 and 222.

The various restriction control valves (valves 50, 52, 54, 56, 62) disclosed in the drawing are identical in structure and only valve 50 will be described and identical parts of the other valves carry identical suffixs to their respective general number indicating the same item. Restriction control valve 50 includes an orifice 50A, bypass opening 50B, and a ball 50C engageable with opening 50B to close same. Orifice 50A and opening 50B may be provided in a thin plate 50D which would be mounted in the valve body for the transmission to facilitate changing of the sizes of the orifice to provide for calibration of the transmission for various conditions.

The logic valve mechanism 60 includes an orifice 240 and a ball 242 engageable with the orifice 240.

Each of the accumulators 46 and 48 includes a piston 250 having lands of differential areas 252 and 254 thereon. A spring 256 is provided resisting movement of the piston 250 in an upward direction. As described earlier, the operation of the accumulators 46 and 48 is more particularly described in U.S. Pat. No. 3,744,348 mentioned above.

A governor pressure conduit 302 is provided connected at one end of each of the 1–2 and 2–3 shift valves. Conduit 302 supplies pressure responsive to the speed of the vehicle and is obtained by a speed responsive valve, as more particularly described in the aforementioned U.S. Pat. No. 3,744,348. A conduit 304 is connected to the opposite ends of the 1–2 and 2–3 shift valves. Conduit 304 has a pressure therein responsive to engine load which may be supplied by a throttle responsive valve as is known in the art and is more particularly described in U.S. Pat. No. 3,744,348.

A conduit 309 connects port 122 of 1–2 shift valve 34 to conduits 310 and 311. Conduit 310 connects port 122 of 1–2 shift valve 34 to port 168 of 2–3 shift valve 38. Conduit 311 connects conduit 309 to restriction control valve 50. A conduit 312 connects restriction control valve 50 to friction element B2, logic valve 60 and restriction control valve 54. A conduit 314 connects restriction control valve 54 with accumulator 46. Conduit 72 is connected to port 124 of 1–2 shift valve 34. A conduit 316 connects port 170 of 2–3 shift valve 38 to port 214 of valve 42. Conduit 318 connects port 172 of valve 38 and port 220 of valve 42. Conduit 320 interconnects ports 216 and 222 of valve 42 with an orifice 322 provided in the conduit 320. Conduit 320 also connects the aforementioned ports to the restriction control valve 56. A conduit 324 connects restriction control valve 56 to friction element B1 and logic valve 60. A conduit 330 connects port 166 of valve 38 with restriction control valve 52. A conduit 322 connects restriction control valve 52 with clutch C2 and restriction control valve 62. A conduit 334 connects restriction control valve 62 with C2 accumulator 48. A plurality of exhaust ports are provided in various valves to exhaust fluid pressures when required. The exhaust ports are 120 and 130 of 1–2 shift valve 34, and port 218 of valve 42.

For purposes of description, conduits 309, 310, 311, 316, 324, 312 and 320 comprise a conduit means for connecting the source of pressure in conduit 72 to brakes B1 and B2. The conduit means can be stated to be comprised of a first branch for brake B2 which would comprise conduits 311 and 312, and a second branch for brake B1 comprised of conduits 310, 316, 320 and 324.

The operation of the control system as described above is as follows. When manual valve 30 is placed in any of its forward D, 2, or 1 positions, as described, fluid pressure is supplied to conduit 72 which as controlled by accumulator 44 engages clutch C1. This will condition the transmission for first ratio operation, since as disclosed in FIGS. 1 and 2, first ratio is established with clutch C1 engaged and one-way clutch 20 acting as a reaction member. Conduit 72 also supplies line pressure to port 124 of the 1–2 shift valve. when the 1–2 shift valve moves to its upper position, as illustrated in the drawings, which is the up-shifted or 2 position to which it will move by the force created on the land 110 by governor pressure in conduit 302 at a point at which engine load pressure in conduit 304 and spring 116 allows such movement of the shift valve. Line pressure from conduit 72 will be supplied to conduit 310. At this time the 2–3 shift valve will be in its lower position, as illustrated in the drawings, and thus pressure in conduit 310 will flow through the groove between lands 156 and 158, port 170 and into conduit 316. At this time the valve 42 will be in its illustrated position to the right as urged by spring 212. Pressure will then flow through ports 214 and 216 to conduit 320. The pressure in conduit 320 flows through orifice 56A, the ball 56C at this time closing bypass opening 56B, into conduit 324. At the same time, pressure in conduit 324 begins to engage brake B1, pressure supplied from conduit 311 flows through orifice 50A into conduit 312 to engage brake B2. Orifice 56A is larger than orifice 50A such that the pressure in conduit 324 will be slightly higher than the pressure in conduit 312 initially so that the forces acting on the ball 242 of logic valve 60 will unseat the ball 242. Thus conduits 312 and 324 will be interconnected and the pressures will equalize. This equalized pressure is applied through orifice 54A and bypass opening 54B and conduit 314 to accumulator 46. Thus a common accumulator 46 acts to equalize the pressures in conduit 312 and 324 and thus the engaging pressures for brakes B2 and B1.

Referring to the table of FIG. 2 it will be seen that both brakes B1 and B2 are applied to obtain second speed ratio which is advantageous to split the torques between the brakes to allow for smaller friction elements to meet the torque loads and to increase the thermal capacity of the second speed brake mechanism. After the brakes B1 and B2 are engaged pressure will begin to buildup in port 222 and act on land 210 of valve 42 which will tend to move valve stem 202 to the left as viewed in the drawings such that valve 42 begins to regulate the pressure in conduit 320. At this time the pressure in conduit 324 will be reduced due to the operation of valve 42 and with the pressure in conduit 324 less than that in conduit 312 the ball 242 will at this time seat and close orifice 240. Due to this reduced lower pressure holding brake B1 in engagement, ball 242 will remain in position closing orifice 240 and when a shift to third speed ratio is made, brake B1 can be disengaged as is required without brake B2 being disengaged. As will be apparent even without use of valve 42, exhaust of fluid pressure in conduit 324 will seat ball 242 permitting brake B2 to remain engaged.

From the above description it can be seen that the unique logic valve 60 serves to interconnect the pressures supplied to the one-way brake B2 and two-way brake B1 such that the pressures will be identical since they are interconnected and applied to accumulator 46. Thus the friction elements B1 and B2 will initially be applied with the same engaging force to provide for a smooth 1–2 shift or in the alternative a smooth 3–2 shift. In addition, action of valve 42 in reducing pressure in conduit 324 will help to provide a smooth 3–2 shift, since the B1 brake is applied when shifting to second ratio from third ratio.

When the 3–2 shift valve moves to its third speed position in which clutch C2 is to be engaged and brake B1 disengaged, pressure in the conduits 316 and 318 will be interconnected through the area between lands 158 and 160 and will be exhausted through port 218 to release brake B1. Pressure in conduit 310 at this time will be connected through ports 168 and 166 to conduit 330, where it will flow through orifice 52A into conduit 332 to engage clutch C2. Pressure in conduit 332 also flows through orifice 62A and bypass opening 62B and conduit 334 to be applied to piston 250 of accumulator 48 such that the accumulator controls the engagement of clutch C2 to provide for a smooth engagement as described in the aforementioned patent. It should be mentioned at this point, that the brake B2 is not released since it is merely holding one-way clutch 18 which will overrun when the third speed ratio is established, thus conveniently, brake B2 can remain engaged.

The unique restriction control valve 62 is effective to help provide for a controlled release of clutch C2 when a 3–2 shift is to be accomplished. In a 3–2 shift, shift valve 38 moves to its lower or second speed position again interconnecting conduit 310 with conduit 316 to engage brake B1. At the same time, pressure on clutch C2 is to be exhausted through port 166 and 164 and conduit 78 through manual valve 30 to release clutch C2. On the fill cycle for clutch C2 accumulator 48 is effective and it will be seen that pressure in conduit 332 can flow through the bypass opening 62B and the orifice 62A is not effective at this time and the accumulator controls engagement of clutch C2. However, on the 3–2 downshift, when clutch C2 is to be released, pressure in the accumulator 48 and conduit 334 will seat the ball 62C and orifice 62A becomes effective. Thus the pressure in conduit 332 can be exhausted through the orifice 52A and bypass 52B in the restriction control valve 52 to release clutch C2 even before the accumulator 48 is returned to its "de-stroked" or lower position illustrated. By means of this unique restriction control valve 62 the 3–2 shift can be easily controlled since there is no necessity to wait for release of clutch C2 until the accumulator 48 is completely "destroked".

From the above it will be seen that the present control system provides a unique arrangement whereby a logic valve provides for interconnection of a one-way brake and a two-way brake for second speed ratio to obtain the advantage of engagement of both while at the same time connecting both to the same accumulator to ensure identical pressure buildup at the servomotors for the brakes B1 and B2 to provide proper engagement. In addition, the present control system provides the unique orifice control valve 62 which will eliminate the effect of the accumulator 48 upon disengagement of clutch C2 to provide for easy control of the 3–2 downshift through the transmission. It will be apparent, however, that the size of orifice 62A may be varied to vary the effect of accumulator 48 on the disengagement of clutch C2 to calibrate or suit the transmission to specific environments.

Various of the features of the invention have been particularly shown and described, however, it should be obvious to one skilled in the art that various modifications may be made therein without departing from the scope of the invention.

What is claimed is:

1. A hydraulic control system for an automatic transmission including input and output shafts and a gear set connected between said shafts, a plurality of fluid actuatable engageable devices adapted to produce a plurality of drive ratios by selective engagement thereof, two of said devices being engageable to establish a particular drive ratio, a source of pressure for said control system, a hydraulic accumulator, conduit means between said source and said two engageable devices, said conduit means being connected to said accumulator, a logic valve means in said conduit means adapted to interconnect said two engageable devices with one another and with said accumulator whereby the pressure buildup in said engageable devices will be equalized.

2. An hydraulic control system as claimed in claim 1 wherein said conduit means has a first branch connected to one of the engageable devices and the accumulator, a second branch connected to the other engageable device, and the logic valve means interconnecting said branches.

3. An hydraulic control system as claimed in claim 2 wherein the logic valve means comprises an orifice and a ball therein engageable with said orifice to close same.

4. An hydraulic control system as claimed in claim 3 wherein higher pressure in the first branch as compared to the second branch will close the orifice in the logic valve by moving the ball into engagement therewith.

5. An hydraulic control system as claimed in claim 4 wherein a pressure reducing valve is provided in the second branch acting to reduce the pressure in the second branch when the engageable devices are engaged.

6. An hydraulic control system as claimed in claim 5 wherein a first restriction and a bypass opening therefor is provided in the first branch between the source and the accumulator and said one engageable device whereby the bypass opening will be effective to supply unrestricted flow of fluid to the accumulator when the engageable device is being engaged and the bypass will be closed and the flow of fluid restricted when the accumulator is supplying fluid to the first branch when said one engageable device is disengaged.

7. An hydraulic control system as claimed in claim 6 wherein a second restriction and bypass therefor is provided in the first branch between the source and the first restriction and bypass whereby the flow of fluid into the first branch from the source is restricted and the flow of fluid from the first branch back to the source is unrestricted when said one engageable device is disengaged.

8. A hydraulic control system for an automatic transmission including input and output shafts and a gear set connected between said shafts, a plurality of fluid actuatable engageable devices adapted to produce a plurality of drive ratios by selective engagement thereof, two of said devices being engageable to establish a particular drive ratio, a source of pressure for said control system, a hydraulic accumulator, conduit means between said source and said engageable devices, said conduit means having first and second branches each connecting to one of said engageable devices, logic valve means in said conduit means between said first and second branches adapted to interconnect same, an accumulator device connected to said first branch, a pressure reducing valve being provided in the second branch acting to reduce the pressure in the second branch when said two engageable devices are engaged, and said logic valve acting to interrupt the connection between said branches when the pressure in said second branch is exhausted.

9. An hydraulic control system as claimed in claim 8 wherein the logic valve means comprises an orifice and a ball therein engageable with said orifice to close same, and higher pressure in the first branch as compared to the second branch will close the orifice in the logic valve by moving the ball into engagement therewith.

* * * * *